April 6, 1954     O. VON ZELEWSKY     2,674,145
LATHE

Filed May 28, 1948     3 Sheets-Sheet 1

INVENTOR:
Ottomar Von Zelewsky
BY
ATTORNEYS

April 6, 1954  O. VON ZELEWSKY  2,674,145
LATHE

Filed May 28, 1948  3 Sheets-Sheet 2

INVENTOR:
Ottomar Von Zelewsky
BY
Richard g Geier
ATTORNEYS

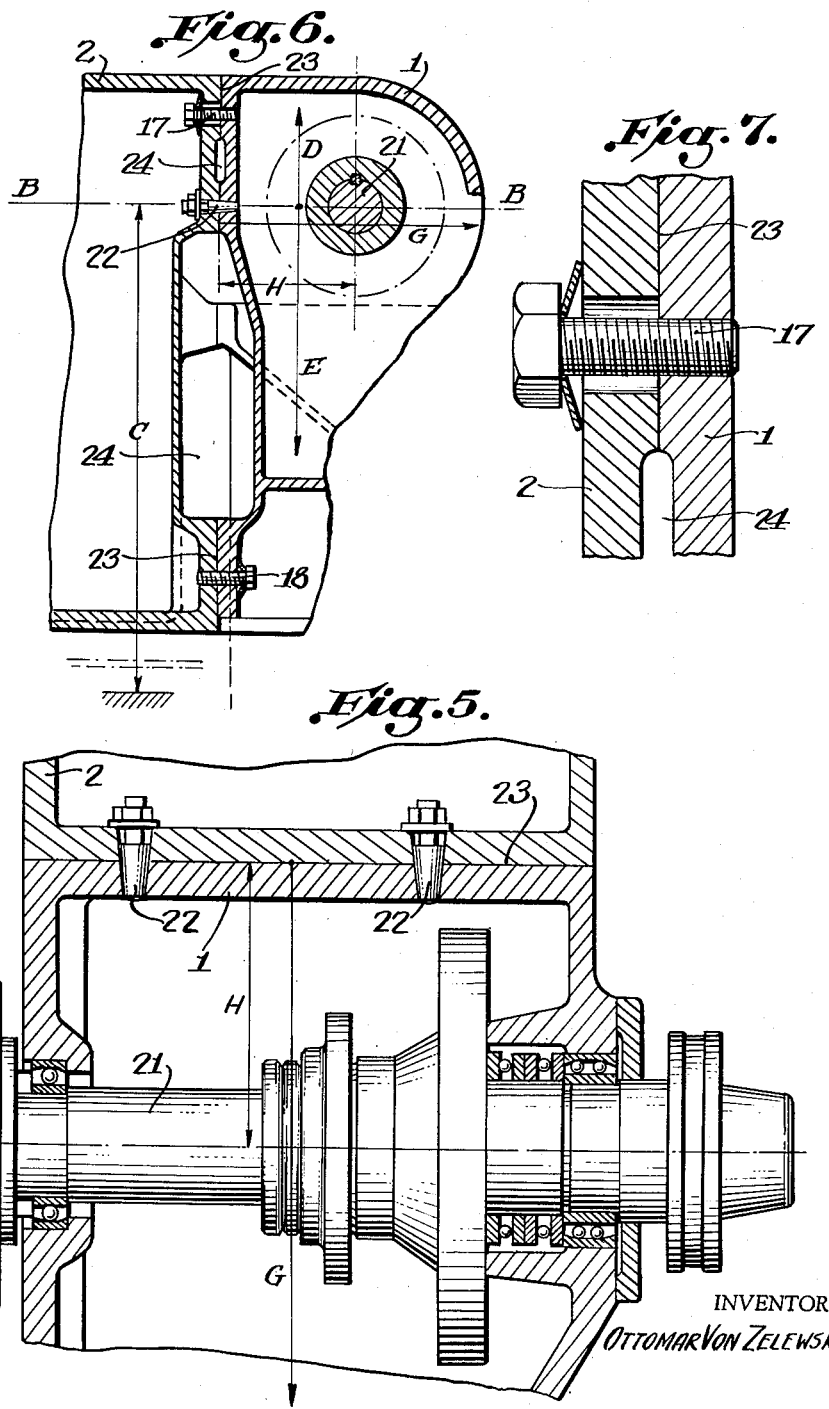

Patented Apr. 6, 1954

2,674,145

UNITED STATES PATENT OFFICE 2,674,145

LATHE

Ottomar von Zelewsky, Neuhausen am Rheinfall, Switzerland, assignor to Georg Fischer Aktiengesellschaft, Schaffhausen, Switzerland Application May 28, 1948, Serial No. 29,680

1 Claim. (Cl. 82—28)

This invention relates to lathes and an object of the present invention is the provision of a lathe headstock mounting in a lathe with a bed formed as a hollow body, two slideways with vertical faces, one superimposed over the other, being arranged on said bed. The upper way serves as a slideway for the tailstock, the lower as a slideway for the saddle. The tailstock and the saddle can move horizontally along the entire length of the bed, on their slideways, independently each of the other. On the saddle is mounted an upper slide obliquely approachable at an acute angle to the axis of the spindle. This upper slide carries a turning tool movable in a vertical plane. The upper slide is, for example, hydraulically controlled by a feeler or tracer which slides along a template or along a pattern. It is known practice with such lathes to mount the headstock at the front of the bed instead of bolting it on top of the bed. Changes in atmospheric temperatures and heating due to friction of moving parts of the transmission and of the electric motor cause expansions and subsequent contractions in the parts mainly around the headstock. In known constructions of lathes this causes a change in the position of the axis of the headstock spindle with respect to the bed and the tool which in turn leads to differences in the turning diameters, so that the turning accuracy changes with the temperature fluctuations in the lathe. Another object of the present invention is to eliminate this drawback, and the lathe in accordance with the present invention differs from known types in that the headstock is rigidly connected to the vertical face of the bed only at points being in a horizontal plane leading through the axis of the headstock spindle only, but can expand under temperature fluctuations in the remaining directions.

The drawings illustrate an embodiment of the invention, the figures representing:

Fig. 1 an elevation,

Fig. 2 a view in plan,

Fig. 3 a section along the line III—III of Fig. 1,

Fig. 4 a section along the line IV—IV of Fig. 1.

Fig. 5 is a horizontal section along the line V—V of Fig. 1.

Fig. 6 is similar to Fig. 3 and shows the various parts in greater detail.

Fig. 7 shows on a larger scale the support for the bolt 17.

Figure 1:
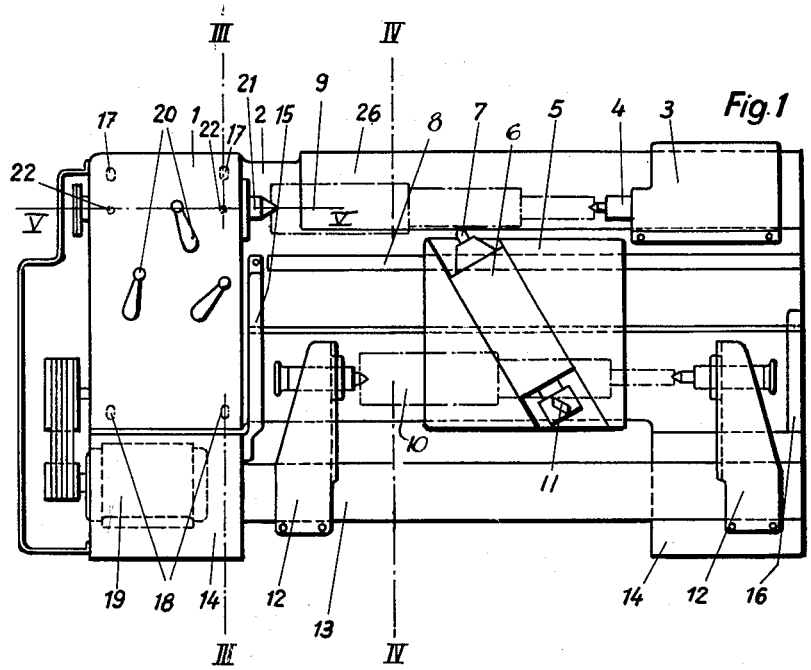
Figure 2:
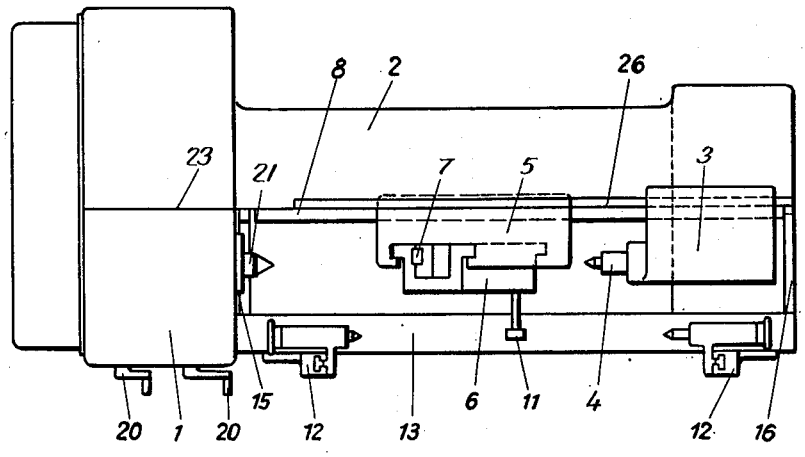

Figs. 1 to 4 show the main components of the lathe; 1 is the headstock, 2 the bed and 26 an upper slideway to which the tailstock 3 with the tail spindle 4 can be clamped. The saddle 5 with the upper slide 6 and the lathe tool 7 moves along the lower slideway 8 by means not shown in the drawings. The lines of dots and dashes in Fig. 1 show the contours of a workpiece 9 and of a pattern 10. 11 is the feeler or tracer which is located on the upper slide 6 and which when moved along the contour of a pattern 10 or along a template (Fig. 4) controls the vertical movements of the upper slide 6 with the lathe tool 7 on the saddle 5 by means of a hydraulic system not shown; 12 are pattern holders, which are displaceably mounted on the front brace 13 of the lathe, which front brace connects the left-hand and right-hand standards or feet 14. 15 and 16 are struts bracing the lathe bed 2 against the standards or feet 14. A motor 19, mounted in the foot 14 under the headstock 1, drives the headstock gear not shown in the drawing. This gear setting the spindle R. P. M. is operated by the levers 20.

Figure 3:
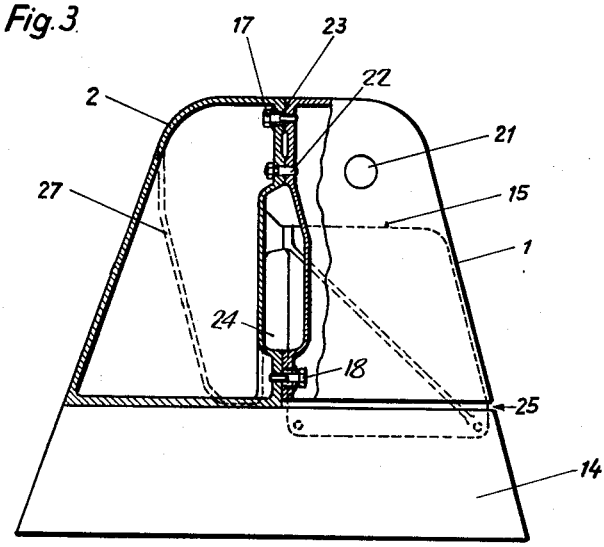
Figure 4:
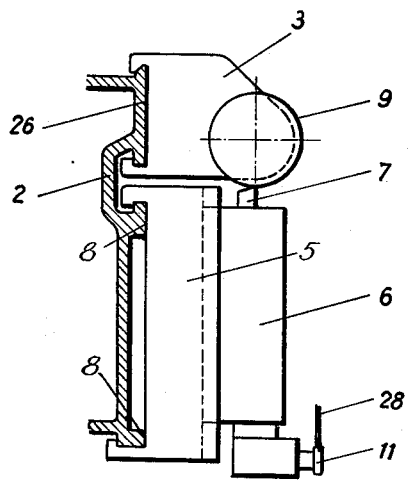

The particular arrangement by which the headstock is fixed to the bed in accordance with the present invention is shown in Fig. 1 and Fig. 3. The bed 2 is shown in section in Fig. 3, taken along the line III—III in Fig. 1. Between the standards or feet 14 the bed 2 is constructed as a hollow body, the rear wall of the bed being indicated in Fig. 3 by the lines 27. The lathe spindle 21 is mounted in the headstock 1 in the usual manner. In the horizontal plane leading through the lathe spindle 21 the headstock 1 is connected to the vertical face 23 of the bed 2 by means of dowel pins 22. Both the screws 17 and the screws 18 permit of slight displacements due to temperature fluctuations of the headstock 1 in respect of the bed 2 at the points of securement 17 and 18. Should the lathe be capable of producing workpieces of a precise cylindrical circumference in a cold state and also after the parts of the machine have been heated, then the distance A must remain constant, said distance being that of the edge F (Fig. 1) of the pattern 10 from the spindle axle 21. Thus, the distance of the pattern 28 from the axle 21 must remain constant (Fig. 4). This requirement must be met since the tool 7 engages the workpiece 9 from the bottom. From a practical point of view, the part 2 will not be heated to any appreciable extent, since it does not contain any parts which are heated so that the distances A and C remain substantially unchanged. It should be noted in this connection that the heating of the part 2 through the contacting surfaces 23 of the headstock 1 will heat only the portions close to the surfaces 23, but not the lower part of the bed 2, so that no substantial changes in length will take place in bed 2 and the distance C of the pins 22 upon the axle B from the base will not change to any noticeable extent. On the other hand, the headstock 1 will be heated as the result of friction in the bearings and gears, so that it will expand. The pins 22 hold the headstock 1 in the horizontal plane B so that the axle 21 will not change its position in relation to the edge F. Therefore, the distance A remains substantially constant. The expansions in the headstock caused by the heat will be transmitted in the direction of the arrows D, E, G.

As shown in Figures 5, 6, 7, it is apparent that due to the provision of the bolts 17 and 18, in the event of a non-uniform heating of the headstock and bed 2 the headstock 1 can slide upon the vertical surface of the bed 2 thereby varying the width of the air gap 25.

It is apparent that when the headstock 1 is expanded in the direction of the arrow G the distance H will also be varied. Fig. 4 shows, however, that the tool 7 engages the workpiece 9 from below so that any changes in the distance H have only a very small effect upon the precision of the work, particularly since the saddle 5 and the upper slide 6 are also heated. This was proven by actual experiments.

The space 24 between the dowel pins 22 and the screws 18 can, in accordance with Fig. 3, be of such size that it can allow a certain quantity of air to circulate. Fig. 3 shows the bracing 15 of the bed 2 against the foot or standard 14 projecting below the headstock 1. This bracing is necessary because an air gap 25 is provided between the headstock 1 and base 14. When the headstock expands under the influence of heat, the air gap 25 alters. As the bed 2 is not heated to the same extent as the headstock 1, the height of the spindle 21 over the base 14 and the pattern holder 12 connected to the latter remains practically unaltered.

The special method of mounting the headstock in accordance with the present invention enhances the machining accuracy of a lathe by rendering same largely independent of heat expansion in the headstock 1. As the lathe tool 7 machines the workpiece 9 from below, heat expansion in a horizontal direction, i. e., between the dowel pin 22 and the lathe spindle 21, exercises very little influence on the turning diameter. Alterations in the headstock 1 in a vertical direction are transmitted, when the headstock is secured in accordance with the present invention, neither to the bed nor to the base 14, so that the turning accuracy remains practically uninfluenced by heat expansions in the headstock 1.

Heat insulation between the headstock 1 and the bed 2 can be enhanced by inserting intermediate packing of insulating materials at the points of contact of the headstock 1 with the bed 2, i. e. at the vertical face 23. The dowel pins 22 can, by way of example, be replaced by keys which fit accurately into keyways in the headstock 1 and the bed 2.

I claim:

In a machine tool, a headstock, a bed and a spindle carried by said headstock, said headstock and said bed having adjoining substantially parallel faces; a tool mounted on said bed for feed movement in a plane parallel to said faces, means connecting said faces to prevent movement between said faces and connecting means in the plane of said faces, said connecting means lying in the plane which contains the axis of said spindle and is perpendicular to the plane of said tool movement, and other means connecting said faces located on opposite sides of said first-mentioned connecting means and spaced therefrom along the direction of tool movement and interconnecting said faces with play whereby movement is prevented at the zone of said first connecting means and limited relative movement of said faces may occur beyond said zone as a result of thermal changes or the like, said faces having spaced portions enclosing a temperature-regulating space.

References Cited in the file of this patent
UNITED STATES PATENTS

| Number | Name | Date |
|--------|------|------|
| 310,260 | Dodds | Jan. 6, 1885 |
| 972,297 | Tyberg | Oct. 11, 1910 |
| 1,512,631 | Muller | Oct. 21, 1924 |
| 2,080,207 | Hoppe | May 11, 1937 |
| 2,376,100 | Turrettini | May 15, 1945 |
| 2,437,570 | Von Zelewsky | Mar. 9, 1948 |